United States Patent
Ebert et al.

(10) Patent No.: US 8,556,010 B2
(45) Date of Patent: Oct. 15, 2013

(54) DRIVE UNIT FOR A HYBRID VEHICLE

(75) Inventors: Angelika Ebert, Schonungen (DE);
Wolfgang Grosspietsch, Schweinfurt (DE); Robert Reiser, Nenzingen (DE);
Heinz Bertels, Meersburg (DE);
Andreas Ratte, Hambach (DE);
Alexander Markow, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 445 days.

(21) Appl. No.: 12/905,712

(22) Filed: Oct. 15, 2010

(65) Prior Publication Data

US 2011/0088958 A1 Apr. 21, 2011

(30) Foreign Application Priority Data

Oct. 15, 2009 (DE) .................... 10 2009 045 727

(51) Int. Cl.
*B60K 6/22* (2007.10)
(52) U.S. Cl.
USPC ................... 180/65.25; 180/65.22
(58) Field of Classification Search
USPC .......... 180/65.21, 65.22, 65.25, 65.26; 477/3, 477/5
See application file for complete search history.

(56) References Cited

U.S. PATENT DOCUMENTS

| | | | |
|---|---|---|---|
| 2006/0289209 A1* | 12/2006 | Grosspietsch et al. | 180/65.2 |
| 2008/0072586 A1 | 3/2008 | Hammond et al. | |
| 2009/0283344 A1* | 11/2009 | Arnold et al. | 180/65.22 |

FOREIGN PATENT DOCUMENTS

| | | |
|---|---|---|
| DE | 199 34 936 | 2/2000 |
| DE | 10 2005 053 887 | 5/2007 |
| DE | 10 2007 043 737 | 3/2009 |
| DE | 102007043737 A1 * | 3/2009 |
| EP | 1 736 345 | 12/2006 |

* cited by examiner

*Primary Examiner* — Katy M Ebner
(74) *Attorney, Agent, or Firm* — Cozen O'Connor

(57) ABSTRACT

A drive unit includes an internal combustion engine with a driven shaft, a transmission with an input shaft, and an electric machine arranged between the internal combustion engine and the transmission and comprising a stator and a rotor which can be coupled at least indirectly to the driven shaft of the internal combustion engine and to the transmission input shaft in order to transmit torque. The drive unit includes a clutch arranged in the torque transmission path between the internal combustion engine and the transmission. To facilitate the decoupling of rotational irregularities occurring in the drivetrain of the hybrid vehicle the drive unit has a first torsional damper and a second torsional damper, and at least the rotor of the electric machine is arranged within a torque transmission path formed between the torsional dampers.

15 Claims, 2 Drawing Sheets

DRIVE UNIT FOR A HYBRID VEHICLE

BACKGROUND OF THE INVENTION

1. Field of the Invention

The invention is directed to a drive unit for a hybrid vehicle that can be driven optionally by an internal combustion engine and/or an electric motor.

2. Description of the Related Art

A drive unit of this kind is described in EP 1 736 345 A1, for example.

SUMMARY OF THE INVENTION

One embodiment present invention provides an economical drive unit which is easy to assemble, compact, and capable of effectively damping rotational irregularities occurring in a vehicle drivetrain depending on the respective operating state.

A drive unit is provided that comprises an internal combustion engine with a driven shaft, a transmission with an input shaft, and an electric machine arranged between the internal combustion engine and the transmission comprising a stator and a rotor that can be coupled at least indirectly to the driven shaft of the internal combustion engine and to the transmission input shaft in order to transmit torque. To facilitate the decoupling of rotational irregularities occurring in the drivetrain of the hybrid vehicle the drive unit is constructed with a first torsional damper. A second torsional damper. At least the rotor of the electric machine is arranged within a torque transmission path formed between the torsional dampers. Further, the drive unit can comprise a clutch arranged in the torque transmission path between the internal combustion engine and the transmission, but this clutch can also be arranged outside this torque transmission path, i.e., between the internal combustion engine and the first torsional damper or within the gear-changing transmission, for example.

In certain operating states, particularly in internal combustion engine operation and in electric motor operation or in a mixed mode of operation, a decoupling of drivetrain vibrations that impair riding comfort can be improved over the prior art in that two individual torsional dampers which are connected in series in the torque transmission path, at least the inertia of the rotor of the electric machine acting therebetween, are used to damp torsional vibrations occurring in a hybrid vehicle. An immediate agglomeration of mass can be substantially eliminated in the torsional damper arranged on the internal combustion engine side by connecting to the rotor of the electric machine, and possibly to the clutch, on the secondary side. Therefore, the torsional damper which is mounted downstream of the electric machine and possibly downstream of the clutch in the torque path can also be constructed in a correspondingly compact manner. Due to the individual torsional dampers, the frequency spectrum to be damped can also be covered over a broader range overall and in a more effective manner. The proposed drive unit can accordingly contribute substantially to noise reduction and reduced wear at gear interfaces outside and inside the transmission.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in the following by way of example with reference to the accompanying drawings. In the drawings.

DETAILED DESCRIPTION OF THE PRESENTLY PREFERRED EMBODIMENTS

Figure 1:
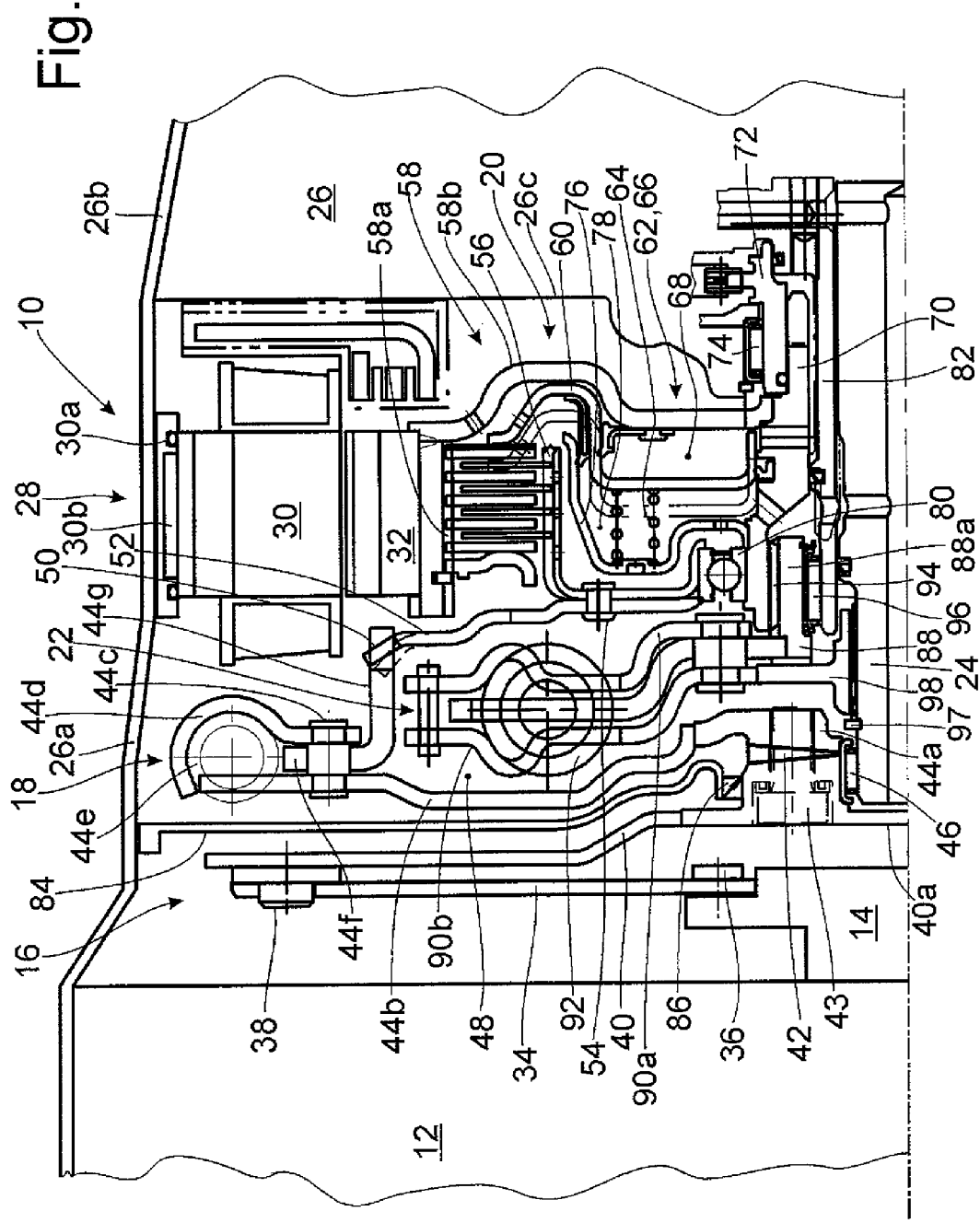
FIG. 1 is a drive unit with an internal combustion engine, a transmission, and two torsional dampers, between which an electric machine and a clutch are functionally arranged.

FIG. 1 shows a drive unit 10 with an internal combustion engine 12 as a first drive source having a driven shaft which is constructed as a crankshaft 14 and whose torque can be introduced into a gear-changing transmission 26 via a coupling arrangement 16, a first torsional damper 18, a clutch 20, and a second torsional damper 22 via an input shaft 24 so as to be transmitted from the gear-changing transmission 26 to the driving wheels of a hybrid vehicle via additional drivetrain elements beyond the scope of the present disclosure and not shown in the drawing. Further, the drive unit 10 has an electric machine 28 with a stator 30 and a rotor 32 as a second driving source whose torque can be introduced into the portion of the drivetrain segment located between the internal combustion engine 12 and the transmission 26. The transmission 26 is preferably constructed in the present instance as a stepped fully automatic transmission. Normally, a hydrodynamic torque converter is connected in front of a transmission 26 of this type, but this is omitted for the sake of the functional elements mentioned above. It should be stressed that in the present embodiment of drive unit 10 only one individual, electively shiftable clutch 20 is provided between the internal combustion engine 12 and the transmission 26, and this clutch 20 can limit the transmitted torque entirely or only by a certain amount for starting and for changing gears.

The construction of the portion of the drivetrain located between the internal combustion engine 12 and the transmission 26 will be described in detail in the following.

First, the coupling arrangement 16 following the crankshaft 14 in the torque path comprises an axially flexible torque transmission plate in the form of a flex plate 34 which is connected to the crankshaft 14 on the radially inner side by screw bolt 36 and to a substantially axially rigid transmission disk 40, referred to as a drive plate, on the radially outer side by bolt 38. Owing to this connection, axial crankshaft oscillations and a tolerance-dependent defective axial fit that may occur when assembling the drive unit 10 can be compensated in a simple manner. This reliably prevents undesirable strain between the functional elements lying in the torque transmission path between the internal combustion engine 12 and the transmission 26.

The drive plate 40 is shaped so as to be slightly angled axially in its radially inner area to provide freedom of movement and has a hollow hub 40a which is in a rotationally driving connection with a hub 44a of the first torsional damper 18 by means of a positive engagement connection 42. In the present case, the positive engagement connection 42 is constructed as an axial positive engagement connection, particularly as a Hirth joint, in which the two hubs 40a, 44a are axially clamped by a plurality of screw bolts 43. A bearing 46, which is represented in this instance as a rolling bearing that extends at least partially along the two hubs 40a, 44a, is formed or arranged at the radially inner side of the connected hubs 40a, 44a. The coupling arrangement 16 and the first torsional damper 18 can be supported on the input shaft 24 of the automatic transmission 26 by this bearing 46, or the bearing provides a bearing location for the transmission input shaft 24.

Together with an adjoining disk-shaped cover plate 44b, which extends substantially radially outward and another cover plate 44d and is connected to the latter by rivets 44c, the hub 44a remote of the crankshaft 14 simultaneously forms the input part of the first torsional damper 18. A plurality of chambers for receiving springs 44e are formed in circumferential direction between the cover plates 44b, 44d. The ends of the springs 44e are supported at the cover plates 44b and 44d on one side and at an annular collar 44f of a hub element 44g on the other side. This hub element 44g is arranged axially between the cover plates 44b, 44d and is supported so as to be displaceable relative to the latter along a certain rotational angle area. It can be seen from FIG. 1 that the spring assembly 44e of the torsional damper 18 extends radially to the stator 30 of the electric machine 28 and that the hub element 44g representing the output part is constructed so as to be angled axially in the radially outer area of the torsional damper 18 and accordingly forms a horizontal tubular extension so as to form a cup-shaped receiving space 48 for arranging the second torsional damper 22.

On the side facing the transmission 26, the hub element 44g has a positive engagement connection 50 for the rotational driving of a driver element 52 that extends substantially radially in this instance and which forms a portion of an input part 52 of the clutch 20. For this purpose, tooth profiles are provided at the two elements 44g and 52, which are fashioned as shaped sheet metal parts, the teeth and spaces of these tooth profiles engaging in one another. The toothed profile of the driver element 52 is shaped like a relatively long tooth finger and is bent somewhat in the direction of the corresponding profile so that, when assembling, there is a certain springing action which holds the operatively mating part in mutual contact without play, allows axial and radial compensation.

In the present embodiment, the clutch 20 is constructed as a wet multi-disk clutch, for which purpose the driver element 52 is fixedly connected in a radially inner portion by a rivet connection 54 to an inner disk carrier 56 having teeth on the radially outer side. A plurality of inner disks are arranged on the inner disk carrier 56 so as to be axially displaceable and engage in the intermediate spaces of a plurality of outer disks which are axially displaceable on an outer disk carrier 58 which likewise has teeth and is disposed at a distance radially from the inner disk carrier 56, which inner disks can be brought into a frictional engagement with the outer disks.

The entire stack formed of disks can be loaded against the action of a restoring member 64, which is formed in this instance as a helical pressure spring, by a pressure-actuated hydraulic piston 60 of an actuating device 62 so as to control the transmission of torque between the outer disk carrier 58 and the inner disk carrier 56 and the downstream elements. The inner disks in the multi-disk clutch are preferably constructed as friction disks as can be seen from FIG. 1. The piston 60 serves to limit a pressure space 68 formed inside a pressure medium cylinder 66. This pressure space 68 is further defined by a radially extending portion of the outer disk carrier 58 and by a hollow clutch hub 70 fixedly connected to the latter. The clutch hub 70 forms an intermediate shaft which is in turn fixedly connected to a pump hub 72 supported by the transmission bell housing 26a and transmission case 26b by a bearing 74. The pump hub 72 is a component part of a pump arranged at the transmission 26 by which a fluid pressure can be built up and, as a result, an exchange of oil can take place between the clutch 20 and the transmission 26.

Sealing elements are provided between the piston 60 on one side and the outer disk carrier 58 and clutch disk 70 on the other side. Also associated with the pressure medium cylinder 66 is a wall region 76 which is disposed at an axial distance from the piston 60 on the internal combustion engine side and which, together with the piston 60 and a portion of the clutch hub, defines a centrifugal force pressure compensation chamber 78 which is sealed on the radially outer side by a sealing element cooperating with the piston 60.

Another portion of the clutch hub 70 is constructed as a bearing location for bearing support of the clutch input element, in this instance particularly the inner disk carrier 56, and is provided for receiving a bearing. In the present instance, a rolling bearing 80 is arranged in the above-mentioned portion, A modification can also be carried out, wherein the input part of the clutch 20 is fixedly connected to the clutch hub 70, while the output part is supported on the hub 70 so as to be rotatable.

FIG. 1 also shows that the transmission input shaft 24 is constructed so as to be hollow and that a tubular supporting hub 82, which is arranged so as to be fixed with respect to the transmission, extends radially between the transmission input shaft 24 and the clutch hub 70 in direction of the internal combustion engine 12 and, together with the clutch hub 70 and terminates at approximately the same axial position.

Fluid channels are formed inside and between the transmission input shaft 24, the supporting hub 82 and the intermediate shaft or clutch hub 70 by radial intermediate spaces and radial openings. These fluid channels create a fluid connection between a fluid circuit provided in the transmission 26 on the one hand and the actuating piston 60 of the clutch 20 and the centrifugal force pressure compensation chamber 78 on the other hand for actuation of the clutch 20.

The wall region of the centrifugal force pressure compensation chamber 78 is interrupted on the radially inner side in the vicinity of the bearing position 80 so that fluid can be conveyed therefrom radially outward to the inner side of the inner disk carrier 56, where it enters the intermediate spaces between the disks through the openings provided therein for cooling and can be conveyed onward from there toward the radially outer side, e.g., through openings in the outer disk carrier 58.

Accordingly, it can be seen that the clutch 20 is constructed as a normally-open type for push-type actuation. In a modification of the embodiment example shown in the drawing, it is also possible to construct the input part of the clutch 20 as an outer disk carrier.

The clutch 20 are controlled by a transmission control device which is not shown in the drawing. The wet space created by the wet clutch 20 is partitioned off on the one hand by the transmission case 26b, or, more precisely, by a front wall 26c delimiting the transmission 26, and by the transmission bell housing 26a. In addition, an intermediate housing can be inserted, if required, for the purpose of axial lengthening of the installation space. Further, an intermediate wall 84 is arranged axially between the drive plate 40 and the input part 44b of the first torsional damper 18. This intermediate wall 84 is attached to the transmission bell housing 26a on the radially outer side and contacts the hub 40a of the drive plate 40 on the radially inner side in a sealing manner by means of a radial sealing ring 86. Accordingly, the coupling arrangement 16 comprising flex plate 34 and drive plate 40 is located in a dry space delimited from the wet space.

In the torque transmission path described thus far which starts at the internal combustion engine 12, the clutch 20 is followed by the second torsional damper 22 which is arranged inside the receiving space 48 of the first torsional damper 18. The second torsional damper 22 comprises an input part which is designed as a hub element 88 and which is arranged axially between two cover plates 90a, 90b forming the output part. These cover plates 90a, 90b are fixedly connected to one another and are rotatable relative to one another by a certain amount against the action of a spring assembly 92 which is in turn fitted into chambers between these two parts. A torque transmitted by the clutch 20 is introduced via a frictional engagement connection 94, formed as a spline, between the clutch hub 70 and a tubular extension 88a of the hub element 88 inserted axially in the clutch hub 70.

It can be seen from FIG. 1 that the second torsional damper 22 is supported with its tubular extension 88a by another bearing 96, in this case a rolling bearing, on the supporting hub 82 which is fixed with respect to the transmission. For the purpose of forming another bearing position and for transmitting torque, an internally toothed hub 98 is provided at the radially inner area of the cover plate 90b facing the internal combustion engine 12. This internally toothed hub 98 is fitted onto the input shaft 24 of the transmission 26, the input shaft 24 having an external toothing in this portion, and is secured axially by a retaining ring 97, while the transmission input shaft 24 itself is supported by the bearing 46. In addition, an axial bearing is inserted between the input part, i.e., the hub element 88, and the output part, particularly the hub 98. A disk spring acts between the retaining ring 97 and the hub 98 to generate an axial preloading of the second torsional damper 22 in direction of the clutch 20.

As was already mentioned, the drive unit 10 has an electric machine 28 so that, in addition to an all internal combustion engine operating mode, the vehicle can also be driven alternatively, when required, solely by the electric motor or in a mixed operating mode. This electric machine 28 is constructed in the present case as a permanently excited synchronous motor with internal rotor. The stator 30 is arranged and supported so as to be fixed with respect to relative rotation in the transmission bell housing 26a by a stator support 30a by screws, not shown. The specific type of construction of the electric machine 28 with respect to its electromagnetic operation is not relevant for the following, i.e., this electric machine 28 can also be provided as an asynchronous motor, reluctance motor, or the like.

Depending on the active length of the electric machine 28, an intermediate housing which expands the axial and/or radial installation space can also be provided, if necessary, to accommodate the electric machine 28.

The rotor 32 which is rotatably supported inside the stator 30 is connected to the outer disk carrier 58 of the clutch 20 so as to be fixed with respect to rotation relative to it and has a laminated rotor yoke on whose outer circumferential surface is arranged a plurality of permanent magnets whose magnetic field can alternate with another magnetic field generated by a winding system of the stator 30 and can accordingly drive the rotor 32 and can serve to drive the vehicle or start the internal combustion engine 12. To this extent, the outer disk carrier 58 serves at the same time as a rotor support. In FIG. 1, the outer disk carrier or rotor support 58 is initially constructed in two parts with an axial portion 58a and a radial portion 58b, the two parts 58a, 58b being connected to one another by a joint, e.g., a weld. Alternatively, it can also be constructed in one piece, e.g., as a shaped sheet metal part. Accordingly, the clutch 20, including the associated actuating member 66, is located radially and axially inside the receiving space enclosed by the electric machine 28, particularly the receiving space surrounded by the rotor 32. Therefore, the electric machine 28 is likewise located inside the wet space described above and can accordingly be cooled simultaneously by the fluid-air mixture spreading out under the influence of centrifugal force. Further, a circumferentially extending cooling channel 30b is provided inside the stator support 30a in which a cooling fluid can circulate, for example, via a flow connection, to a transmission oil circuit and in so doing can also possibly wet the stator coil heads. Alternatively, in a modified construction, the rotor 32 can also be connected to the input part of the clutch 56.

Implementation of the drive unit 10 described above produces a versatile hybrid drive which makes it possible to drive the vehicle solely by the electric motor by decoupling the internal combustion engine 12 by opening the clutch 20. The electric machine 28 can directly drive the pump arrangement of the automatic transmission 26 in motor operation and accordingly also enables all of the hydraulic transmission functions in all-electric operation of the vehicle.

With the clutch closed, the electric machine 28 can execute a flywheel start for starting the internal combustion engine 12. The drive unit 10 is designed in such a way that the lowest possible moment of inertia occurs between the crankshaft 14 and the rotor 32 to start the engine as quickly as possible.

The clutch 20 can be closed while the rotor 32 is rotating, i.e., the stationary internal combustion engine 12 can be connected, so that the driving torque of the electric machine 28 is increased to the extent required for the starting process of the internal combustion engine 12. Meanwhile, the driving torque on the wheels remains unaffected so that this process remains substantially imperceptible to the passengers of the vehicle.

However, for a direct start, it is also possible for the stationary internal combustion engine 12 to be coupled with the rotor 32 of the electric machine by the closed clutch 20 such that it is fixed with respect to relative rotation and to rev up both units from a standstill in unison.

The clutch 20 is closed when driving the vehicle by the internal combustion engine 12. In this ease, the electric machine 28 runs in generator mode. However, the generator operation can be interrupted for a certain period of time, if necessary, while driving the vehicle so that the electric machine 28 can assist the internal combustion engine 12 in motor operation and can accordingly introduce additional torque into the vehicle drivetrain.

When the vehicle is stopped and the clutch 20 is open, the electric machine 28 is capable of maintaining the fluid pressure in the transmission 26 by low input speeds.

When assembling the drive unit 10, the electric machine 28 and the clutch 20, including its actuating arrangement 66, are first installed in the transmission bell housing 26a, the stator 30 is screwed to the latter or to an intermediate housing, and the rotor 32 together with the clutch 20 is inserted into the pump hub 72 by the clutch hub 70. The second torsional damper 22 and the first torsional damper 18 can then be fitted on the transmission input shaft 24 and clutch hub 70, respectively, and the output part 44g of the first torsional damper 18 engages with the driver element 52 of the clutch 20. Subsequently, the intermediate wall 84 separating the wet space from the dry space can be fastened to the transmission bell housing 26a, and the drive plate 40 can be screwed to the input part 44a of the first torsional damper 18. When connecting the internal combustion engine 12 and transmission 26, the bolt 38 protruding axially from the drive plate 40 engages in corresponding openings in the flex plate 34 which has already been connected to the crankshaft 14 beforehand.

Figure 2:
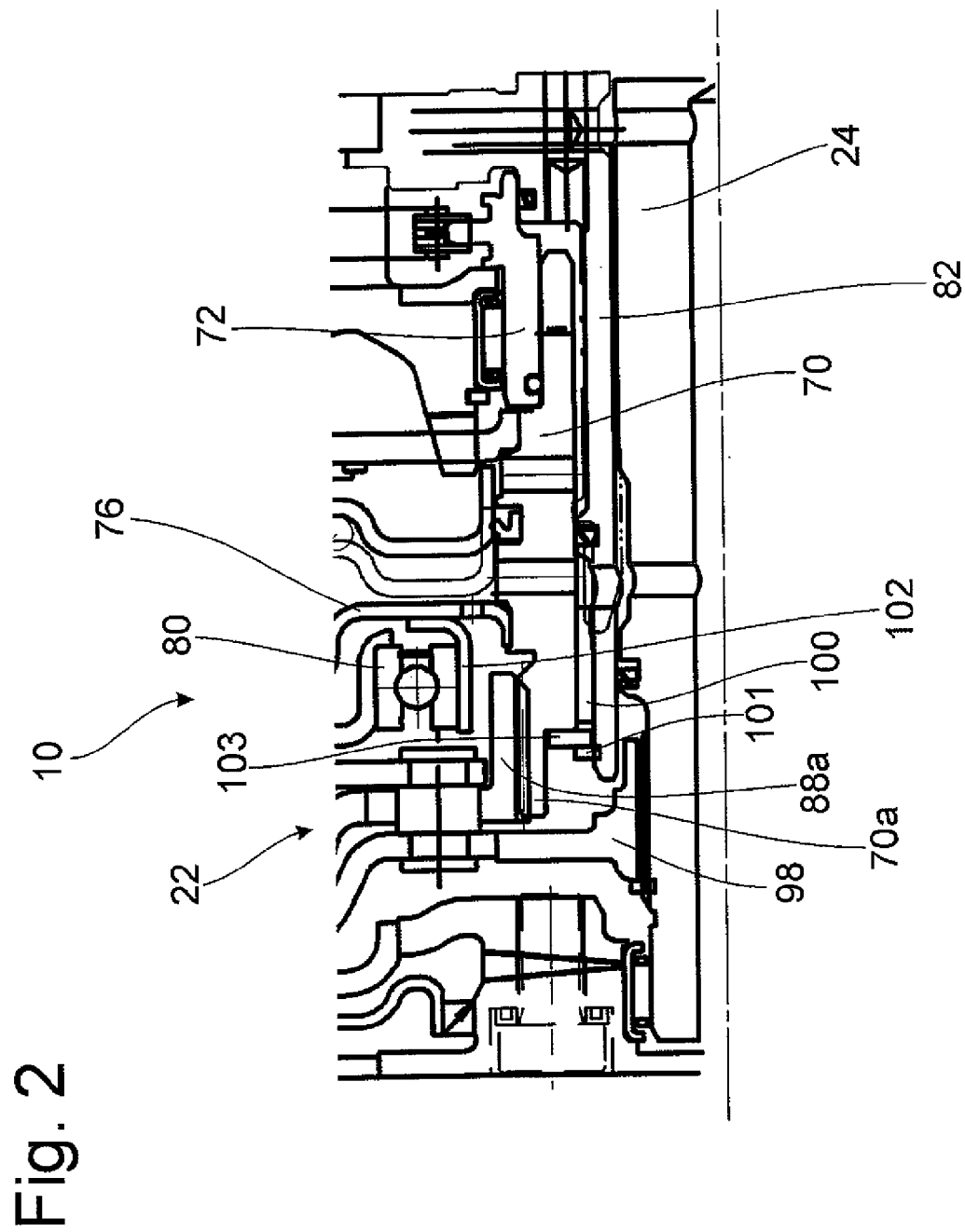
FIG. 2 is a section of the drive unit shown in FIG. 1 with a bearing arrangement which has been modified from that shown in FIG. 1.

FIG. 2 is a detail of the drive unit which is shown in FIG. 1, wherein the bearing design of the clutch 20 and second torsional damper 22 has been modified, as will be explained in the following. The reference numerals used in FIG. 1 are used again.

In direct comparison with FIG. 1, the clutch hub 70 representing the intermediate shaft in the drive unit 10 in FIG. 2 is constructed with an outer toothing at the end portion 70a on the internal combustion engine side, this outer toothing engaging with an internally toothed tubular extension 88a of the torsional damper 22. Apart from the bearing support within the pump hub 72, the clutch hub 70 is also supported at an axial distance from the latter by a bearing 100 arranged between the clutch hub 70 and the supporting hub 82. This bearing 100 is constructed as a friction bearing secured by a retaining ring 101 and a thrust washer 103 cooperating with the clutch hub 70.

In contrast to FIG. 1, the bearing 80 is only indirectly, and not directly, connected to the clutch hub 70. According to FIG. 2, a tubular supporting member 102 is fastened to the wall region 76 of the centrifugal force pressure compensation chamber to receive the bearing 80.

To summarize, the described drive unit 10 offers a comprehensive functionality with a very low space requirement. With respect to the unit formed by the internal combustion engine and an automatic transmission, the drive unit 10 can be arranged between the internal combustion engine and the transmission with almost no effect on installation space by dispensing with the torque converter. A high starting power is made possible through the use of a wet clutch according to the description. Further, a desirable low moment of inertia is realized by means of an internal-rotor type electric machine. According to another aspect, the proposed drive unit is regarded as a modular system in which particularly the torsional dampers, the active length of the electric machine, and the transmission torque of the clutch can be varied by adapting the quantity of disks.

For example, based on the drive unit described with reference to FIGS. 1 and 2, according to another variant, not shown in the drawing, with an electric machine which is longer than that shown in FIG. 1, at least the second torsional damper and possibly also the first torsional damper can be arranged radially and completely or at least partially also axially inside the receiving space formed by the electric machine. Regardless, it is also possible to form the first torsional damper and/or the second torsional damper in modified form with respect to FIG. 1. To this end, for example, the second torsional damper can be constructed by means of two individual dampers which work in parallel functionally and whose hubs are in a rotationally driving connection with the intermediate shaft and whose output elements are connected to one another and cooperate with the transmission input shaft via a common hub element.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive unit for a hybrid vehicle, comprising:
   an internal combustion engine having a driven shaft;
   a transmission having an input shaft;
   a first torsional damper with a first input part and a first output part;
   a second torsional damper with a second input part and a second output part; and
   an electric machine arranged between the internal combustion engine and the transmission comprising:
      a stator; and
      a rotor configured to be coupled at least indirectly to the driven shaft of the internal combustion engine and to the transmission input shaft to transmit torque,
   wherein at least the rotor of the electric machine is arranged within a torque transmission path formed between the first and the second torsional dampers,
   wherein the first torsional damper and the second torsional damper are arranged radially offset with respect to one another and at least partially overlapping one another axially.

2. The drive unit according to claim 1, wherein the second torsional damper is arranged in the torque transmission path on a transmission side between the electric machine and the transmission, is arranged radially inside the first torsional damper, which is arranged in the torque transmission path on an internal combustion engine side between the internal combustion engine and the electric machine.

3. The drive unit according to claim 1, further comprising:
   a clutch arranged in the torque transmission path between the internal combustion engine and the transmission,
   wherein the output part of the first torsional damper is in a rotationally driving connection with an input part of the clutch by a positive engagement connection.

4. The drive unit according to claim 3, wherein the clutch is arranged at least partially within a receiving space formed by the electric machine.

5. The drive unit according to claim 4, wherein at least one of the first and the second torsional dampers is arranged radially and at least partially axially inside the receiving space formed by the electric machine.

6. The drive unit according to claim 3, wherein the rotor of the electric machine comprises a rotor support configured to form a constructional unit with one of the input part or an output part of the clutch.

7. The drive unit according to claim 6, wherein the rotor support is fixedly connected with respect to rotation to an intermediate shaft arranged coaxially to the transmission input shaft and supported at the transmission.

8. The drive unit according to claim 7, wherein:
   one of the clutch input part and the clutch output part is rotatably supported at least indirectly on the intermediate shaft, and
   the other of clutch input part and the clutch output part is fixedly connected with respect to rotation to the intermediate shaft.

9. The drive unit according claim 7, wherein the second torsional damper is supported by the second input part on a supporting hub arranged, between the electric machine and the transmission, radially between the intermediate shaft and the transmission input shaft, and the second output part of the second torsional damper is fixedly coupled with respect to rotation with the transmission input shaft.

10. The drive unit according to claim 9, wherein the transmission input shaft, the supporting hub and the intermediate shaft have fluid channels that form a fluid connection between a fluid circuit provided in the transmission and a fluid pressure space of the clutch and a centrifugal force pressure compensation chamber.

11. The drive unit according to claim 3, wherein the clutch is constructed as a multi-disk clutch.

12. The drive unit according to claim 3, wherein the clutch is constructed as a normally-open clutch for push type actuation.

13. The drive unit according claim 1, wherein the first and second torsional dampers, the electric machine and the clutch are arranged inside a wet space defined by a transmission case and by an intermediate wall arranged, between the electric machine and the internal combustion engine.

14. The drive unit according to claim 1, wherein a clutch hub is supported directly on the transmission input shaft.

15. A drive unit for a hybrid vehicle, comprising:
an internal combustion engine having a driven shaft;
a transmission having an input shaft;
a first torsional damper with a first input part and a first output part;
a second torsional damper with a second input part and a second output part; and
an electric machine arranged between the internal combustion engine and the transmission comprising:
a stator; and
a rotor configured to be coupled at least indirectly to the driven shaft of the internal combustion engine and to the transmission input shaft to transmit torque,
wherein at least the rotor of the electric machine is arranged within a torque transmission path formed between the first and the second torsional dampers,
wherein the first torsional damper and the second torsional damper are arranged on a same axial side at least with respect to the electric machine, and
wherein the first torsional damper and the second torsional damper are arranged radially offset with respect to one another and at least partially overlap one another axially.

* * * * *